United States Patent
Ritchie

(10) Patent No.: US 8,102,414 B2
(45) Date of Patent: *Jan. 24, 2012

(54) OBTAINING CONSUMER ELECTRONIC DEVICE STATE INFORMATION

(75) Inventor: Jonathan G. Ritchie, Tualatin, OR (US)

(73) Assignee: Intel Corporation, Santa Clara, CA (US)

( * ) Notice: Subject to any disclaimer, the term of this patent is extended or adjusted under 35 U.S.C. 154(b) by 722 days.

This patent is subject to a terminal disclaimer.

(21) Appl. No.: 12/201,520

(22) Filed: Aug. 29, 2008

(65) Prior Publication Data

US 2008/0316305 A1    Dec. 25, 2008

Related U.S. Application Data

(63) Continuation of application No. 10/899,741, filed on Jul. 27, 2004, now Pat. No. 7,420,584, which is a continuation of application No. 09/219,134, filed on Dec. 22, 1998, now Pat. No. 6,784,918.

(51) Int. Cl.
*H04N 7/18* (2006.01)
*H04N 5/232* (2006.01)

(52) U.S. Cl. .......................................... 348/61; 348/211

(58) Field of Classification Search .................. 348/61, 348/207.11, 207.1, 211.4, 211.6, 212, 213, 348/160, 143, 159, 156, 155, 153, 565, 154, 348/254, 223, 187, 181, 180; 379/102.01, 379/102.02, 102.03; 386/83; 382/100, 190, 382/192; 725/14, 21

See application file for complete search history.

(56) References Cited

U.S. PATENT DOCUMENTS

| | | | |
|---|---|---|---|
| 4,348,696 A | | 9/1982 | Beier |
| 5,467,264 A | * | 11/1995 | Rauch et al. ................... 700/12 |
| 5,537,463 A | | 7/1996 | Escobosa et al. |
| 5,550,586 A | | 8/1996 | Kudo et al. |
| 5,771,307 A | | 6/1998 | Lu et al. |
| 5,973,683 A | | 10/1999 | Cragun et al. |
| 5,977,964 A | | 11/1999 | Williams et al. |
| 6,065,056 A | | 5/2000 | Bradshaw et al. |
| 6,115,057 A | | 9/2000 | Kwoh et al. |
| 6,115,079 A | | 9/2000 | McRae |
| 6,125,259 A | | 9/2000 | Perlman |
| 6,181,335 B1 | | 1/2001 | Hendricks et al. |
| 6,208,378 B1 | | 3/2001 | Barraclough et al. |
| 6,219,645 B1 | | 4/2001 | Byers |
| 6,286,140 B1 | | 9/2001 | Ivanyi |
| 6,430,358 B1 | | 8/2002 | Yuen et al. |

(Continued)

OTHER PUBLICATIONS

"U.S. Appl. No. 09/219,134, Advisory Action mailed Feb. 10, 2004", 6 pgs.

(Continued)

*Primary Examiner* — Behrooz Senfi
(74) *Attorney, Agent, or Firm* — Schwegman, Lundberg & Woessner, P.A.

(57) ABSTRACT

Apparatus, systems, and methods may operate to obtain an image of a consumer electronic device, the image comprising at least one visual indication of a first operating state of the consumer electronic device, and to transmit one or more commands to the consumer electronic device to change to a second operating state different from the first operating state, responsive to determining the first operating state by extracting information associated with the at least one visual indication from the image. The commands may be determined by accessing a database having control instructions associated with the consumer electronic device. Additional apparatus, systems, and methods are disclosed.

20 Claims, 2 Drawing Sheets

U.S. PATENT DOCUMENTS

| | | | |
|---|---|---|---|
| 6,441,927 | B1 | 8/2002 | Dow et al. |
| 6,542,077 | B2 | 4/2003 | Joao |
| 6,784,918 | B1 * | 8/2004 | Ritchie ............................ 348/61 |
| 7,420,584 | B2 | 9/2008 | Ritchie |
| 2004/0263615 | A1 | 12/2004 | Ritchie |

OTHER PUBLICATIONS

"U.S. Appl. No. 09/219,134, Final Office Action mailed Oct. 22, 2003", 7 pgs.

"U.S. Appl. No. 09/219,134, Non-Final Office Action mailed May 27, 2003", 7 pgs.

"U.S. Appl. No. 09/219,134, Non-Final Office Action mailed Nov. 21, 2002", 7 pgs.

"U.S. Appl. No. 09/219,134, Notice of Allowance mailed Apr. 20, 2004", 6 pgs.

"U.S. Appl. No. 09/219,134, Response filed Feb. 21, 2003, to Non-Final Office Action mailed Nov. 21, 2002", 9 pgs.

"U.S. Appl. No. 09/219,134, Response filed Jul. 24, 2003 to Non-Final Office Action mailed May 27, 2003", 10 pgs.

"U.S. Appl. No. 09/219,134, Response filed Dec. 17, 2003 to Final Office Action mailed Oct. 22, 2003", 15 pgs.

"U.S. Appl. No. 10/899,741, Response filed Mar. 19, 2008 to Non-Final Office Action mailed Jan. 28, 2008", 8 pgs.

"U.S. Appl. No. 10/899,741, Response filed Dec. 19, 2007 to Final Office Action mailed Nov. 2, 2007", 8 pgs.

"U.S. Appl. No. 10/899,741, Response filed Aug. 10, 2007 to Non-Final Office Action mailed Jul. 6, 2007", 12 pgs.

"U.S. Appl. No. 10/899,741, Final Office Action mailed Nov. 2, 2007", 23 pgs.

"U.S. Appl. No. 10/899,741, Non-Final Office Action mailed Jan. 28, 2008", OARN, 6 pgs.

"U.S. Appl. No. 10/899,741, Non-Final Office Action mailed Jul. 6, 2007", 35 pgs.

"U.S. Appl. No. 10/899,741, Notice of Allowance mailed Apr. 28, 2008", 7 pgs.

* cited by examiner

OBTAINING CONSUMER ELECTRONIC DEVICE STATE INFORMATION

This application is a continuation of U.S. patent application Ser. No. 10/899,741, filed on Jul. 27, 2004, now U.S. Pat. No. 7,240,584 which is a continuation of U.S. patent application Ser. No. 09/219,134, filed on Dec. 22, 1998, now issued as U.S. Pat. No. 6,784,918, all of which are incorporated herein by reference in their entireties.

BACKGROUND

The most common classes of controllable devices in households today are consumer electronic devices such as televisions, VCRs, stereo equipment, and home theater systems. Most consumer electronic devices support Consumer Infrared (IR) which consists of numerous proprietary control protocols. Consumer IR allows consumer electronic devices to be remotely controlled using a hand-held remote. For example, a user can change channels on a television by pressing the "Channel Up" button. When this button is pushed, the remote control sends an infrared command to the television, and the television increments its channel.

Infrared transmitter hardware can be added to personal computers (PC) to control consumer electronic devices. This allows the PC to mimic remote controls of various CE devices. Thus, the PC can autonomously control CE devices. However, a problem is encountered in controlling current consumer electronic devices. Specifically, Consumer IR assumes that a person controlling the consumer electronic device is able to observe the present state of the device, and adjust the command sequence accordingly. For example, most video recorders support a single "Power" command. This command changes the power state of the device, such that if the video recorder is off, the power command turns the device on. Likewise, if the video recorder is turned on, the power command turns the device off. Therefore, in order to get a device (e.g. the VCR) into a particular power state (on or off) it is essential that the person controlling the device know whether a consumer electronic device is already turned on.

DETAILED DESCRIPTION

In the following description of various embodiments, reference is made to the accompanying drawings which form a part hereof, and in which are shown by way of illustration specific embodiments. These embodiments are described in sufficient detail to enable those of ordinary skill in the art to practice them, and it is to be understood that other embodiments may be utilized and that logical, mechanical and electrical changes may be made without departing from the scope of the various embodiments of the invention. The following detailed description is, therefore, not to be taken in a limiting sense, such that the scope of the various embodiments is defined only by the appended claims.

To overcome the one-way limitation of consumer infrared control, a personal computer (processor) should determine a current state of a consumer electronic device in which control is desired. The processor is not limited to a traditional desk top computer. Embodiments of the invention allow the personal computer to determine the current state of the consumer electronic device by using image processing techniques. One embodiment allows the personal computer to capture a live digital image of a physical device and apply various image processing techniques to determine the device's current operating state. For example, if a personal computer is trying to activate a video recorder, the personal computer can capture a digital image of the video recorder's front panel display. Applying video processing techniques, the personal computer can locate and identify individual icons displayed on the video recorder's front panel display. The existence or absence of certain icons can be used to determine the current state of the video recorder. Once the current state of the device is known, the personal computer can issue appropriate commands to place the video recorder into a desired state. For instance, if the only icon being displayed by the device is the "time of day" clock, the personal computer can determine that the video recorder is powered off. If the personal computer detects other icons, it can be determined that the video recorder is turned on. Using this information, the personal computer can accurately determine how to get the video recorder turned on (either by issuing a "power" command, or doing nothing).

Figure 1:
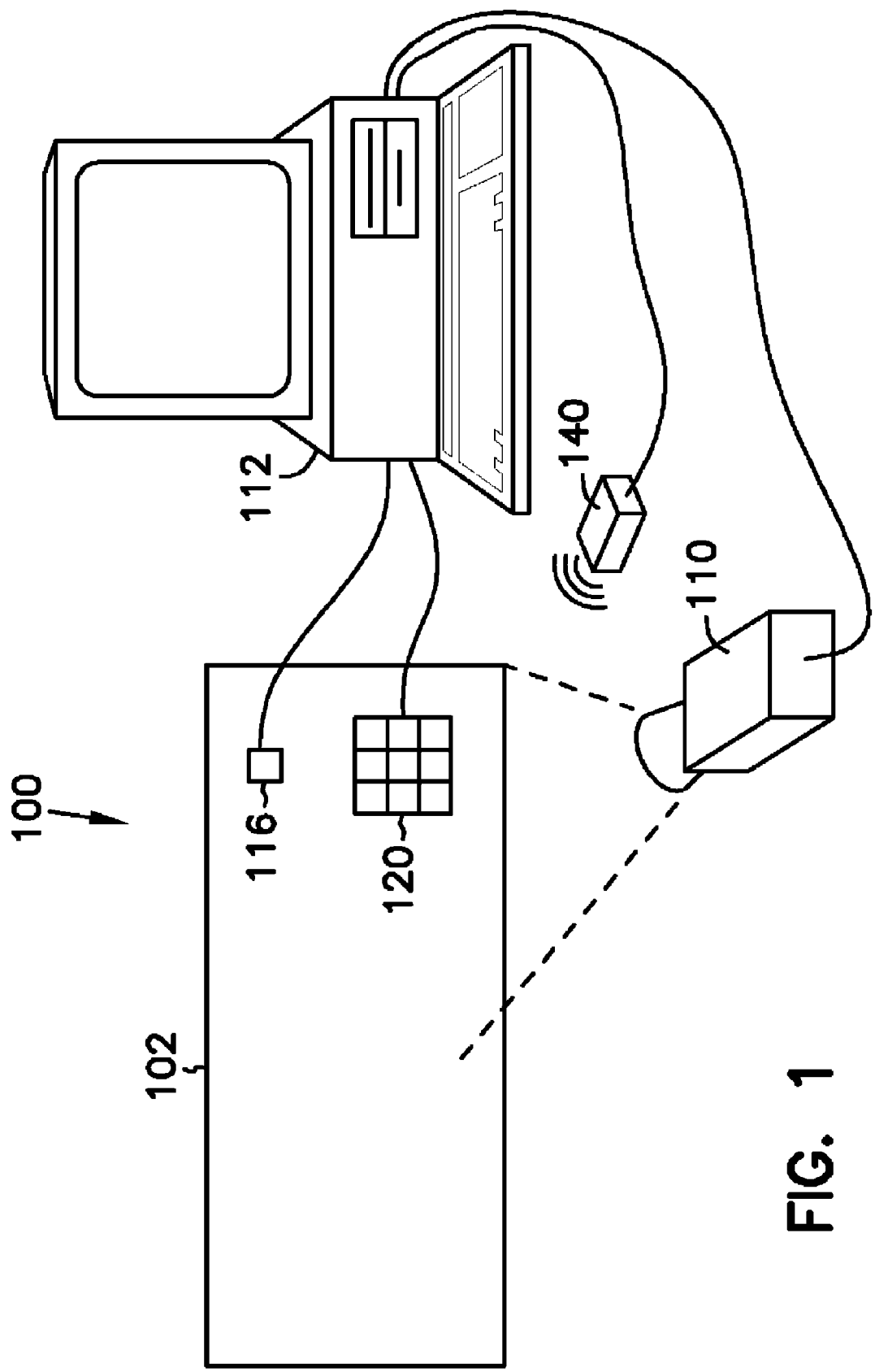
FIG. 1 illustrates a consumer electronic device and a camera.

FIG. 1 illustrates different ways in which a personal computer can determine an operating state of a consumer electronic device 100 using an image detection device, such as a camera or sensor. Again, the consumer electronic device can be a television, video recorder, stereo, home theater system, or the like. The consumer electronic device has a front panel, or display 102. This display provides visual feedback, or operating state indication, to a user. For example, when the consumer electronic device is a television, a current station and volume setting is typically displayed on the television screen. A camera 110 is provided, in one embodiment, having a field of view including the consumer electronic device to capture a video image of the consumer electronic device front panel. The camera is connected to a personal computer 112, as described in greater detail below. In another embodiment, an optical sensor 116 is provided to detect a light, or LED, provided on the consumer electronic device. The optical sensor is coupled to the personal computer. In another embodiment, an array of optical sensors 120 is coupled to the consumer electronic device and the personal computer.

Figure 2:
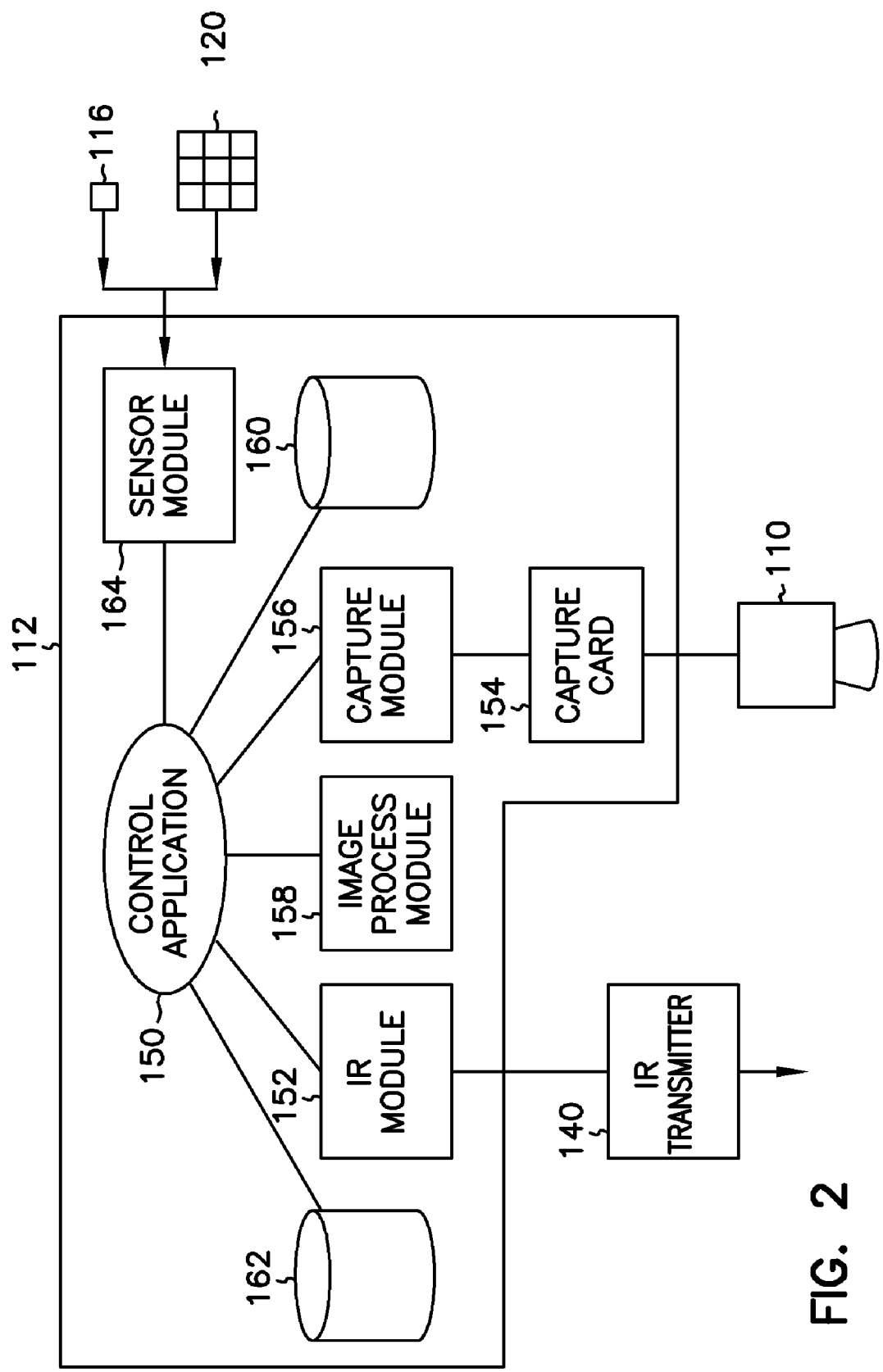
FIG. 2 is a block diagram of a consumer electronic control system.

Assuming that the consumer electronic device is a video recorder (VCR), the VCR can be controlled by the personal computer using an infrared transmitter. The infrared transmitter 140 is connected to the personal computer using one of several mechanisms including a serial port, universal serial bus (USB), or a powerline network, FIG. 2. The infrared transmitter is aimed at the VCR's infrared receiver (usually located on the front of the VCR) and generates consumer IR commands that mimic the device's hand-held remote control. A device control application 150, being executed by the personal computer, controls an infrared transmitter software module 152. Control commands are determined using the consumer IR database 162. The infrared transmitter software module then forwards commands to infrared transmitter hardware 140.

To capture a digital image of the VCR's front panel display, a video camera 110 is connected to the personal computer 112 using one of several options including a standard video capture card 154. The camera is aimed and focused on the VCR's front panel and sends a continuous video image stream to capture card 154. When the control application needs to determine a current state of the VCR, video capture software module 156 captures a digital image of the VCR's front panel display. The captured digital image is sent to image processing module 158 along with a description of various icons that can be displayed on the VCR's front panel. These icon descriptions are stored in database 160 and include information such as icons' location, shape, color, etc. Using these icon descriptions, the image processing module compares the digital image with possible VCR icons to determine which icons are currently displayed. An image processing software module 158 is provided for processing the digital video image captured from the camera.

Photocell 116, or photocell array 120 are used in a similar manner to provide information to the personal computer via wired or wireless communication. A sensor software module 164 can be executed by a control application 150 to determine a current state of the consumer electronic device. For example, a single photocell can be positioned on a front display of a television to indicate whether the television is turned on or off. Similarly, a photocell could be positioned to a light in the house or location of the PC such that the PC can control the light (on, off or brightness). Likewise, photocell array 120 can provide additional information by placing the array on icon display areas of the consumer electronic device.

Such a system allows a personal computer to determine a present state of consumer electronic devices, including VCRs, and accurately control the device without any user intervention. By enabling the personal computer to determine the state of existing consumer electronic devices, the personal computer can provide a wide variety of device control applications using the millions of existing devices currently installed in people's homes.

Thus, to control consumer electronic device operations, a personal computer adapted to transmit IR commands can determine the operating state of a consumer electronic device as part of a system for automatic control of the consumer electronic device. The system may comprise an image detection device for obtaining an image of a consumer electronic device display, a processor coupled to the image detection device for extracting information from the image of the consumer electronic device display and providing control instructions for the consumer electronic device, and an infrared transmitter for transmitting the control instructions to the consumer electronic device.

In another embodiment, a system for controlling a consumer electronic device comprises a camera for obtaining an image of the consumer electronic device, wherein the image comprises visual indications of an operating state of the consumer electronic device. The system includes a computer coupled to the camera for receiving the image and determining at operating state of the consumer electronic device based upon the image, a database containing instructions for changing the operating state of the consumer electronic device, and a transmitting device for transmitting the instructions to the consumer electronic device using infrared signals.

In yet another embodiment, a method is described for controlling a consumer electronic device using a processor. The method comprising obtaining an image of the consumer electronic device, wherein the image comprises visual indications of a first operating state of the consumer electronic device, decoding the image to determine the first operating state, generating control signals in response to the first operating state, and transmitting the control signals to the consumer electronic device to change the consumer electronic device to a second operating state.

Apparatus, systems, and methods of determining an operating state of consumer electronic devices have been described herein such that a personal computer can control the consumer electronic device without user input. The system includes an image detection device for obtaining an image of the consumer electronic device. The image detection device can be a camera, or other sensor such as a photocell(s). A processor is coupled to the image detection device for extracting information from a consumer electronic device display image. The processor generates control instructions for the consumer electronic device, and provides the control instructions to an infrared transmitter for transmitting the control instructions to the consumer electronic device. This application is intended to cover any adaptations or variations of the various embodiments of the invention.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

What is claimed is:

1. A system, comprising:
    an image detection device to obtain an image of a consumer electronic device;
    a transmitter to transmit control instructions to the consumer electronic device responsive to information extracted from the image; and
    a first database to be coupled to a processor, the processor to extract the information from the image, and the database comprising descriptions of icons to be visually provided by the consumer electronic device.

2. The system of claim 1, the image detection device comprising:
    at least one of a camera or an optical sensor.

3. The system of claim 1, the consumer electronic device comprising:
    at least one of a television, a video recorder, or a home theater system.

4. The system of claim 1, the transmitter comprising:
    an infra-red transmitter.

5. The system of claim 1, further comprising:
    a second database comprising instructions to change an operational state of the consumer electronic device.

6. The system of claim 5, the second database comprising:
    a consumer infra-red database.

7. The system of claim 1, further comprising:
    a network to couple the transmitter to the processor.

8. A system, comprising:
    a processor;
    a device control application;
    an image detection device to couple to the processor, the image detection device to obtain an image of a consumer electronic device;
    a transmitter coupled to the processor; and
    a database to be coupled to the processor, the database comprising instructions to change an operational state of the consumer electronic device, the processor to extract information associated with at least one icon from the image, and the transmitter to transmit one or more commands to the consumer electronic device to change the operational state responsive to the information and to execution of the device control application by the processor.

9. The system of claim 8, the commands comprising:
commands that mimic hand-held remote control commands associated with the consumer electronic device.

10. The system of claim 8, further comprising:
an image processing module to compare the information with stored descriptions of icons accessible to the processor.

11. A method, comprising:
obtaining an image of a consumer electronic device, the image comprising at least one visual indication of a first operating state of the consumer electronic device; and
transmitting one or more commands to the consumer electronic device to change to a second operating state different from the first operating state, responsive to determining the first operating state by extracting information associated with the at least one visual indication from the image, the commands determined by a first database having control instructions associated with the consumer electronic device.

12. The method of claim 11, the obtaining further comprising:
obtaining the image using at least one of a camera or one or more optical sensors.

13. The method of claim 11, the at least one visual indication comprising:
an icon.

14. The method of claim 11, the transmitting further comprising:
transmitting infra-red commands to the consumer electronic device.

15. The method of claim 11, the transmitting further comprising:
activating the consumer electronic device by changing from the first operating state comprising an off state to the second operating state comprising an on state.

16. The method of claim 11, further comprising:
controlling lighting proximate to the consumer electronic device.

17. The method of claim 11, further comprising:
retrieving stored icon descriptions; and
comparing the stored icon descriptions with the information.

18. An apparatus, comprising:
at least one processor to run a device control application, the device control application configured to:
obtain an image of a consumer electronic device, the image comprising at least one visual indication of a first operating state of the consumer electronic device; and
transmit one or more commands to the consumer electronic device to change to a second operating state different from the first operating state, responsive to determining the first operating state by extracting information associated with the at least one visual indication from the image, the commands determined by a first database having control instructions associated with the consumer electronic device.

19. The apparatus of claim 18, wherein the device control application is configured to determine the one or more commands after accessing the first database.

20. The apparatus of claim 18, wherein the device control application is configured to access a second database to determine the first operating state.

* * * * *